Patented July 28, 1936

2,049,213

UNITED STATES PATENT OFFICE 2,049,213

ANTHRASELENAZOLE DERIVATIVES AND PROCESS OF MAKING THEM

Ralph N. Lulek, Wilmington, Del., assignor to E. I. du Pont de Nemours & Company, Wilmington, Del., a corporation of Delaware No Drawing. Application April 29, 1930, Serial No. 448,436. Renewed September 28, 1933

10 Claims. (Cl. 260—44)

This invention relates to organic compounds and more particularly to dyestuffs and dyestuff intermediates of the anthraquinone series. Specifically, it contemplates the condensation products of 1:9-anthraselenazole-2-carboxylic-acid-chloride.

Nawiasky and Sauerwein (U. S. Patent 1,539,689 of May 26, 1925, have disclosed certain compounds of the type A·CO·NH·A' where A and A' represent an anthraquinone nucleus. Lulek U. S. Patent 1,705,023 of March 12, 1929) by condensing 1:9-anthrathiazole - 2 - carboxylic - acid chloride with amino-anthraquinones has been able to produce compounds of the type At·CO·NH·A' in which At represents a residue of 1:9-anthrathiazole (—CO in 2-position) and A' represents an anthraquinone nucleus.

This invention has an object, the production of a series of new and valuable organic chemical compounds. Other objects are to produce new dyestuffs, new dyestuff intermediates, to devise new processes for the production of dyestuffs, to devise new processes for the production of dyestuff intermediates and to produce new and valuable vat colors. Other objects will appear hereinafter.

These objects are accomplished by the present invention whereby 1:9-anthraselenazole-2-carboxylic-acid is condensed with amino-anthraquinones or derivatives thereof.

The products produced have the general formula:—

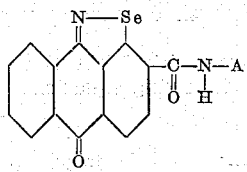

A being an anthraquinone nucleus. In particular, the preferred compounds are:

1—Mono-amino-anthraquinones.
2—Diamino-anthraquinones.
3—Amino-anthraquinones which are halogen substituted.
4—Diamino-anthraquinones in which one of the amino groups has been substituted with an aroyl group.

The invention will be further understood from a consideration of the following examples. The proportions are given by weight.

Example I

Ten (10) parts of 1:9-anthraselenazole-2-carboxylic-acid-chloride, prepared by boiling 1:9-anthraselenazole-2-carboxylic acid with five parts of thionyl chloride for 20 hours and distilling off the excess, are heated with 6.4 parts of alpha-amino-anthraquinone in 250 parts of nitrobenzene at 160° C., for two hours. The product may be purified by passing chlorine through the mixture at 160° C., for two hours. It is filtered at room temperature, washed with nitrobenzene and alcohol, and dried.

The product is a yellow powder and dyes cotton from a dark blue vat in yellow shade very fast to soaping, light, and chlorine. It is insoluble in water, alkali, and hydrochloric acid. The solution color in sulphuric acid is cherry red. The reaction which takes place may be illustrated by the following equation:—

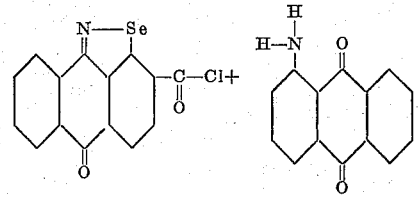

*Example II*

Ten (10) parts of 1:9-anthraselenazole-2-carboxylic-acid-chloride are heated with 6.4 parts of beta-amino-anthraquinone at 160° C., for two hours in 400 parts of nitrobenzene. The product separates in yellow crystals and is purified by chlorinating at 160° C., for two hours. After filtering and washing with nitrobenzene and alcohol it appears as yellow needles.

It dyes cotton in fast yellow shades from a blue hydrosulphite vat. The solution color in sulphuric acid is red. The reaction takes place according to the following equation:

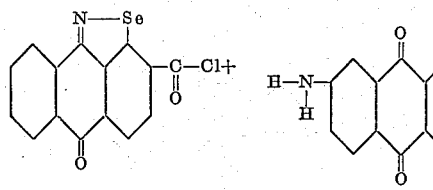

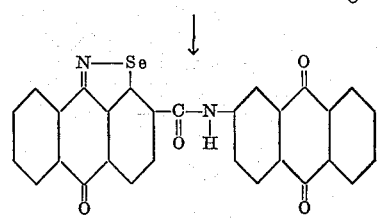

Example III

Ten (10) parts of 1:9-anthraselenazole-2-carboxylic acid are heated to about 100° C., with 8 parts of phosphorus pentachloride in 400 parts of nitrobenzene for two hours. Then 3.3 parts of 1:5-diamino-anthraquinone are added and the mass stirred at 150° C., for two hours. After purifying the product by passing in chlorine at 150° C., for two hours the product is filtered and washed with nitrobenzene and alcohol. It dissolves in concentrated sulphuric acid with red color and dyes cotton from a violet vat in fast yellow shades.

The formation of the dyestuff may be illustrated by the following equation:

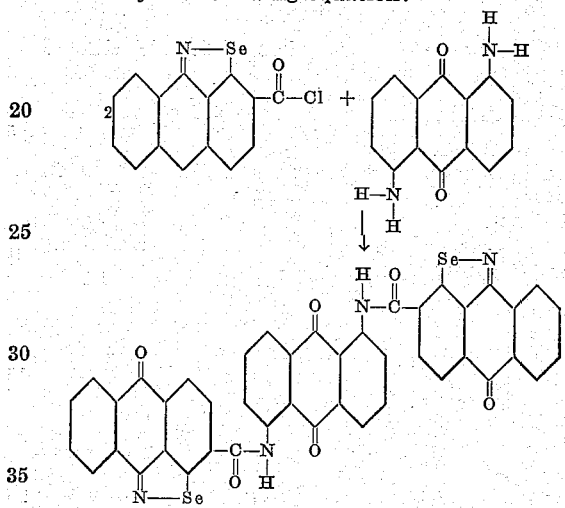

Example IV

Ten (10) parts of 1:9-anthraselenazole-2-carboxylic acid chloride are heated with 3.3 parts of 1:4-diamino-anthraquinone in 400 parts of nitrobenzene at 160° C., for two hours. The dyestuff separates in reddish-brown crystals and is filtered off, washed with nitrobenzene, and dried. It dyes cotton from a violet-blue vat in yellow-brown shades and dissolves in sulphuric acid with red color.

The reaction takes place according to the following equations:

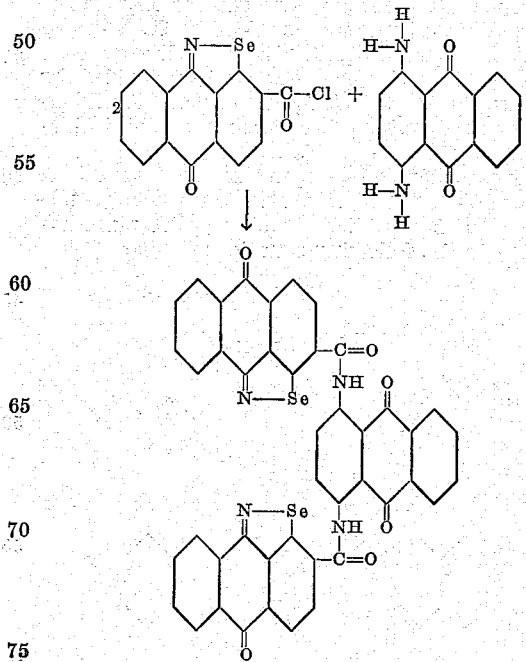

Example V

Ten (10) parts of 1:9-anthraselenazole-2-carboxylic acid chloride are heated with 9.9 parts of mono-benzoyl-1:5-diamino-anthraquinone in 400 parts of nitrobenzene at 130° C., for two hours. The dyestuff separates in yellow crystals and is filtered cold, washed with nitrobenzene and alcohol, and dried. It dissolves in sulphuric acid with a cherry red color and dyes cotton from a blue vat in reddish-yellow shades of exceptional fastness properties.

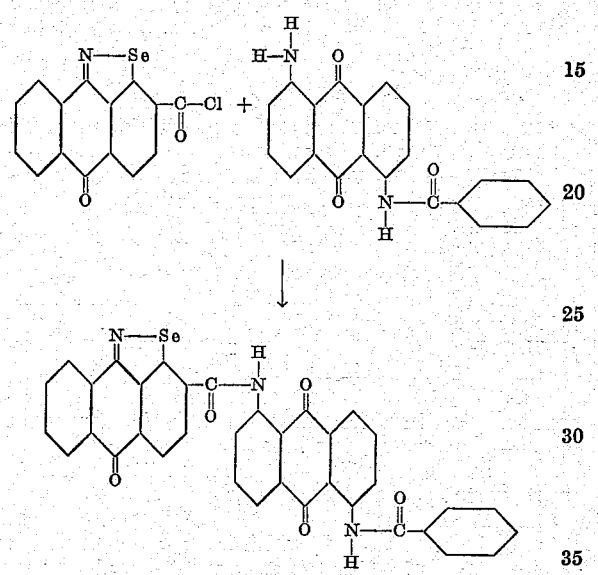

Example VI

Ten (10) parts of 1:9-anthraselenazole-2-carboxylic-acid-chloride are heated with 7.4 parts of 1-amino-6-chloro-anthraquinone in 300 parts of nitrobenzene at 130° C., for two hours. The product separates in greenish-yellow crystals and is purified by passing in chlorine gas at 130° C. After filtering and washing with nitrobenzene and alcohol it appears as a yellow powder, which dissolves in sulphuric acid with a red color. This product dyes cotton from a dark blue vat in greenish-yellow shades of exceptional fastness properties.

The reaction which takes place may be illustrated by the following equation:

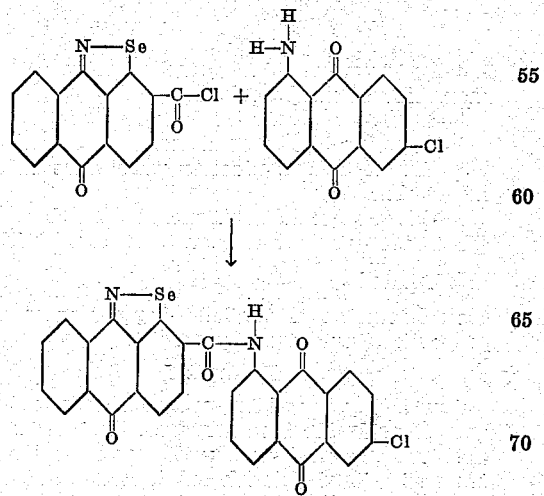

The new vat colors produced according to this invention dye cotton and artificial silk, in shades, varying from greenish yellow to yellow brown, are very fast to washing, chlorine acid, alkali and light.

As many apparent and widely different embodiments of this invention may be made without departing from the spirit and scope thereof, it is to be understood that I do not limit myself to the specific embodiments thereof except as defined in the appending claims.

I claim:—

1. The product which is substantially identical with that obtainable by treating about ten parts of 1:9-anthraselenazole-2-carboxylic-acid-chloride with about 9.9 parts of mono-benzoyl-1:5-di-amino-anthraquinone in the presence of about four hundred parts of nitrobenzene while heated to about 130° C. which probably has the formula—

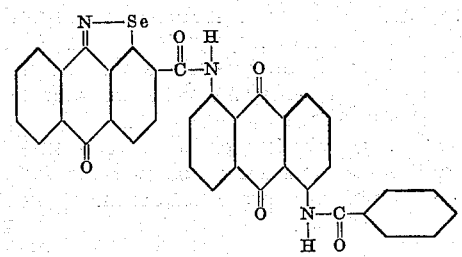

and which dyes cotton reddish yellow from a blue hydrosulfite vat.

2. The product which is substantially identical with that obtainable by treating about ten parts of 1:9-anthraselenazole-2-carboxylic-acid-chloride with about 7.4 parts of 1-amino-6-chloro-anthraquinone in about three hundred parts of nitrobenzene while heated to about 130° C. which probably has the formula—

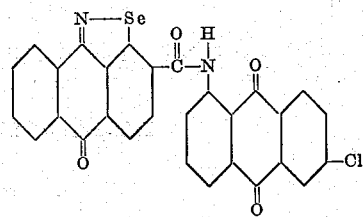

and which dyes cotton greenish-yellow from a blue hydrosulfite vat.

3. A compound of the type—

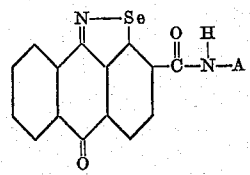

in which A is an anthraquinone radical.

4. The process of producing a compound probably having the formula:

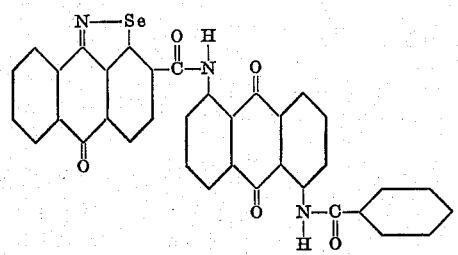

which comprises condensing mono-benzoyl-1:5-di-amino-anthraquinone with 1:9-anthraselenazole-2-carboxylic acid chloride in the presence of nitrobenzene while heating to approximately 130° C.

5. The process of producing a compound probably having the formula:

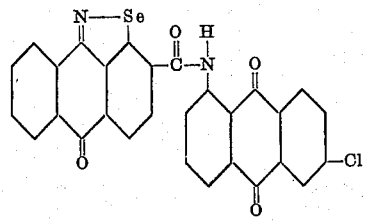

which comprises condensing 1-amino-6-chloro-anthraquinone with 1:9-anthraselenazole-2-carboxylic acid chloride in the presence of nitrobenzene while heating to approximately 130° C.

6. The product which is substantially identical with that obtainable by treating about ten parts of 1:9-anthraselenazole-2-carboxylic acid chloride with about 3.3 parts of 1:5-di-amino-anthraquinone in the presence of about 400 parts of nitrobenzene while heating to about 150° C., which probably has the formula:

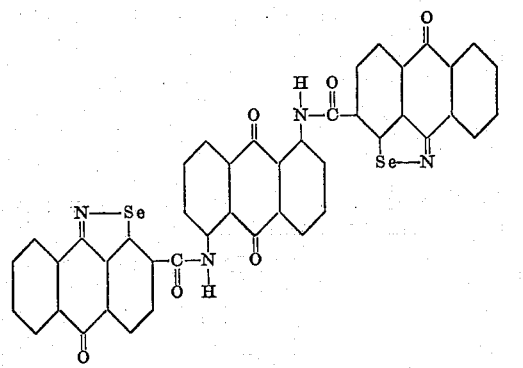

and which dyes cotton yellow from a violet hydrosulphite vat.

7. The process of producing a compound having the probable formula:

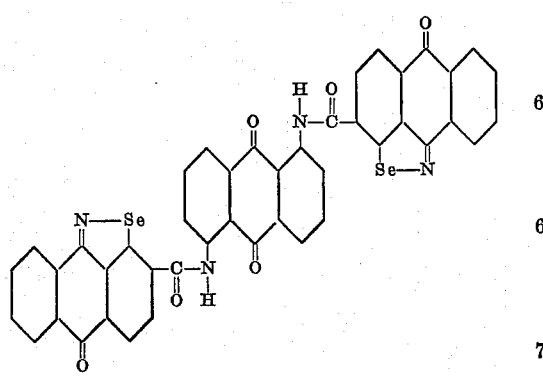

which comprises condensing 1:5-di-amino-anthra-quinone with 1:9-anthraselenazole-2-carboxylic acid chloride in the presence of nitrobenzene while heating to approximately 150° C.

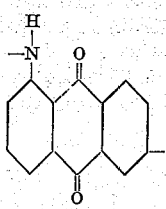

is joined to a radical from the group consisting of—

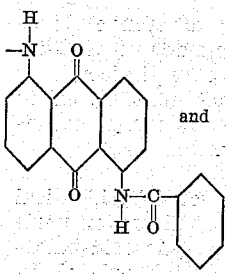 and 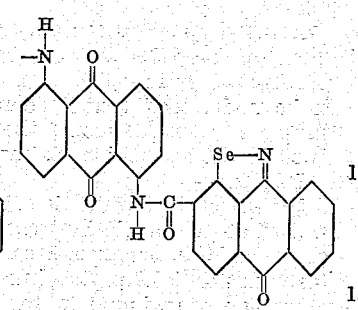

8. A compound having the formula in which the radical—

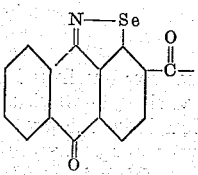

is joined to a radical from the group consisting of—

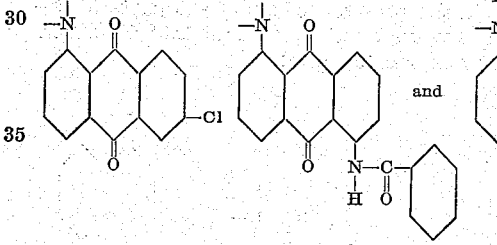

9. The process of producing a compound having the formula in which the radical—

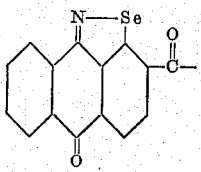

which comprises condensing 1:9-anthraselenazole-2-carbonyl chloride with a member of the group consisting of 1-amino-6-chloro-anthraquinone, 1-amino-5-benzoyl-amino-anthraquinone and 1:5-di-amino-anthraquinone, in the presence of nitro-benzene while heating to approximately 130° C.

10. Process which comprises condensing a 1:9-anthra-selenazole-2-carboxylic-acid-chloride with an alpha-amino-anthraquinone by heating a mixture of the two in a liquid suspension medium which is inert to the reactants.

RALPH N. LULEK.